(12) United States Patent
Kakarlapudi et al.

(10) Patent No.: US 10,929,895 B2
(45) Date of Patent: *Feb. 23, 2021

(54) GENERIC MESSAGE INJECTION SYSTEM

(71) Applicant: Groupon, Inc., Chicago, IL (US)

(72) Inventors: Geetha Kakarlapudi, San Francisco, CA (US); Kannan Nitin Sharma, San Mateo, CA (US); Mohit Gupta, Sunnyvale, CA (US); Avik Sinharoy, Mountain View, CA (US); Christopher S. Trimble, San Francisco, CA (US); Vinesh Gudla, San Francisco, CA (US); Ryan Duane Boyd, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,685

(22) Filed: Sep. 17, 2019

(65) Prior Publication Data

US 2020/0226640 A1 Jul. 16, 2020

Related U.S. Application Data

(63) Continuation of application No. 15/698,203, filed on Sep. 7, 2017, now Pat. No. 10,460,356, which is a continuation of application No. 13/842,449, filed on Mar. 15, 2013, now Pat. No. 9,779,424.

(51) Int. Cl.
*G06Q 30/02* (2012.01)

(52) U.S. Cl.
CPC ..... *G06Q 30/0276* (2013.01); *G06Q 30/0271* (2013.01)

(58) Field of Classification Search
CPC ..................................................... G06Q 30/02
See application file for complete search history.

(56) References Cited

U.S. PATENT DOCUMENTS

| 2002/0004745 | A1 | 1/2002 | Bascobert et al. |
| 2002/0032602 | A1* | 3/2002 | Lanzillo, Jr. ........... G06Q 30/02 705/14.66 |
| 2002/0082912 | A1 | 6/2002 | Batachia et al. |
| 2002/0091748 | A1* | 7/2002 | Rehg ..................... G06N 20/00 718/107 |

(Continued)

OTHER PUBLICATIONS

U.S. Appl. No. 13/842,449, filed Mar. 15, 2013, U.S. Pat. No. 9,779,424, Issued.

(Continued)

*Primary Examiner* — Vincent M Cao
(74) *Attorney, Agent, or Firm* — Alston & Bird LLP

(57) ABSTRACT

Systems and related methods providing for dynamic message creation are discussed herein. Circuitry may be configured receive generic configuration data that references work chunks for message generation and time data indicating a message send time. The work chunks may include references to message data, but not the actual message data. Based on the time data, the work chunks may be placed in a message queue. Circuitry may also be configured to retrieve a work chunk from the message queue and to generate one or more messages based on the retrieved work chunk. The references to message data in the work chunk may be used to retrieve the message data at the time of message generation.

20 Claims, 9 Drawing Sheets

(56) References Cited

U.S. PATENT DOCUMENTS

| | | | |
|---|---|---|---|
| 2003/0088824 A1* | 5/2003 | Ayan | G06Q 30/02 715/201 |
| 2003/0144903 A1 | 7/2003 | Brechner et al. | |
| 2003/0182379 A1 | 9/2003 | Henry | |
| 2003/0200145 A1 | 10/2003 | Krassner et al. | |
| 2004/0138943 A1 | 7/2004 | Silvernail | |
| 2005/0216338 A1 | 9/2005 | Tseng et al. | |
| 2007/0073581 A1 | 3/2007 | Kempe et al. | |
| 2007/0156534 A1 | 7/2007 | Lerner et al. | |
| 2008/0245868 A1 | 10/2008 | Berkun | |
| 2009/0132368 A1 | 5/2009 | Cotter et al. | |
| 2009/0157731 A1* | 6/2009 | Zigler | G06F 16/686 |
| 2009/0248806 A1 | 10/2009 | Teman | |
| 2009/0327079 A1* | 12/2009 | Parker | G06Q 30/0269 705/14.55 |
| 2010/0332401 A1* | 12/2010 | Prahlad | G06Q 30/02 705/1.1 |
| 2011/0066496 A1 | 3/2011 | Zhang et al. | |
| 2011/0078026 A1 | 3/2011 | Durham | |
| 2011/0213657 A1 | 9/2011 | O'Malley et al. | |
| 2011/0238507 A1 | 9/2011 | Ben-Rubi | |
| 2013/0311962 A1 | 11/2013 | Chatterjee et al. | |
| 2013/0346170 A1* | 12/2013 | Epstein | G06Q 30/02 705/14.14 |
| 2014/0229375 A1 | 8/2014 | Zaytzsev et al. | |

OTHER PUBLICATIONS

U.S. Appl. No. 15/698,203, filed Sep. 7, 2017, U.S. Pat. No. 10,460,356, Issued.

* cited by examiner

GENERIC MESSAGE INJECTION SYSTEM

CROSS-REFERENCE TO RELATED APPLICATIONS

This application is a continuation application of U.S. application Ser. No. 15/698,203, filed Sep. 7, 2017, which is a continuation application of U.S. application Ser. No. 13/842,449, filed on Mar. 15, 2013, the entire contents of each are incorporated herein by reference in their entireties.

FIELD

Embodiments of the invention relate, generally, to generating and sending messages to consumers.

BACKGROUND

Merchants may advertise to consumers over a variety of electronic channels, such as email, social networking messages, mobile applications, or text (e.g. short message service (SMS) to a telephonic device). Advertising may be improved by rapidly adapting the message and/or its recipients in response to changing market conditions. In this regard, areas for improving current systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, to provide a generic message injection platform capable of creating messages (e.g., promotional offers and/or advertisements) to multiple consumers over multiple electronic channels, or "channels," as used herein. Some example, but non-exhaustive, electronic channels may include email, social networking messages, mobile applications, or SMS text.

Some embodiments may include an apparatus and/or system configured to implement the methods and/or other functionality discussed herein. In other words, the apparatus may include one or more processors and/or other machine components configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
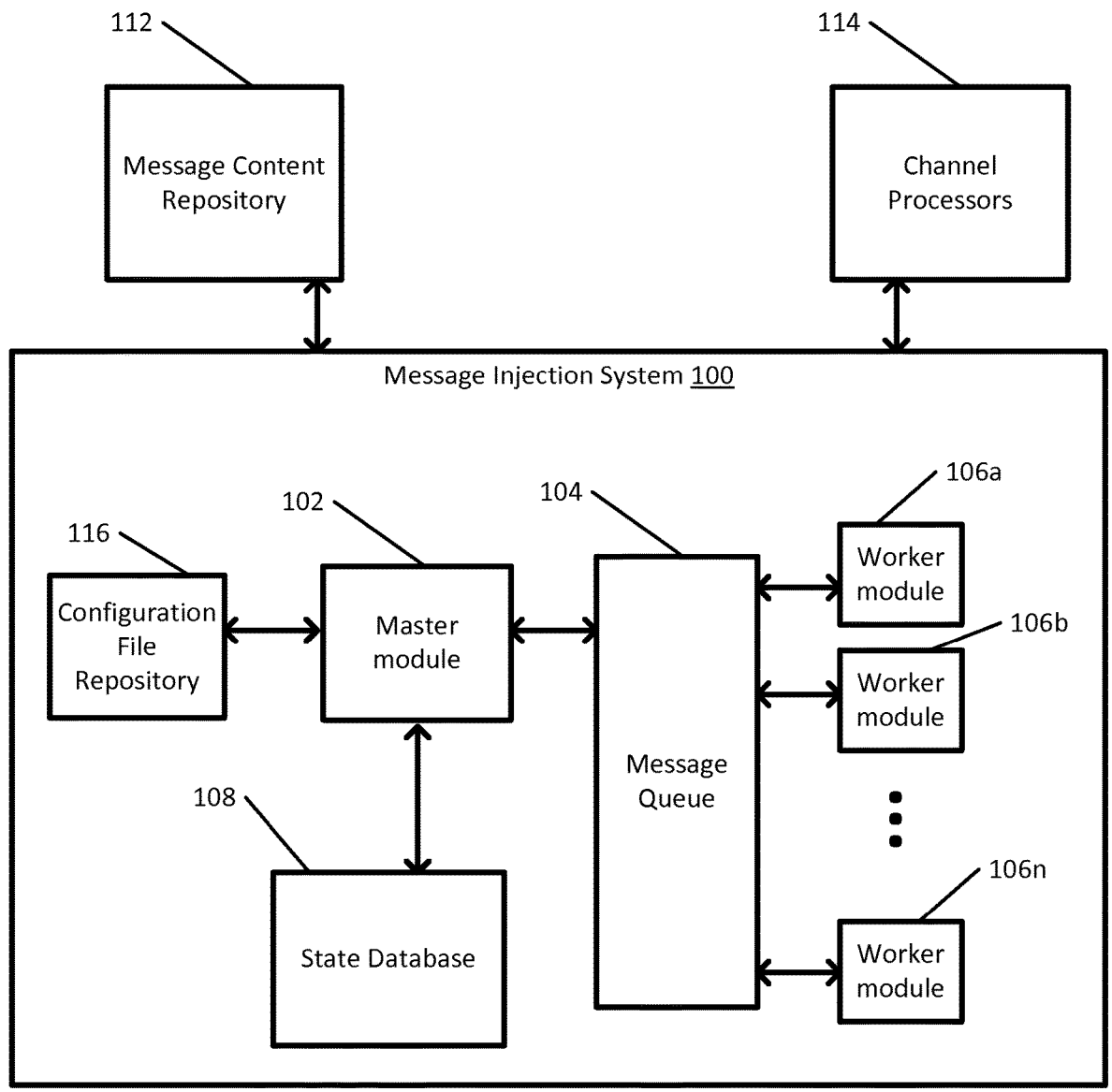
Figure 2:
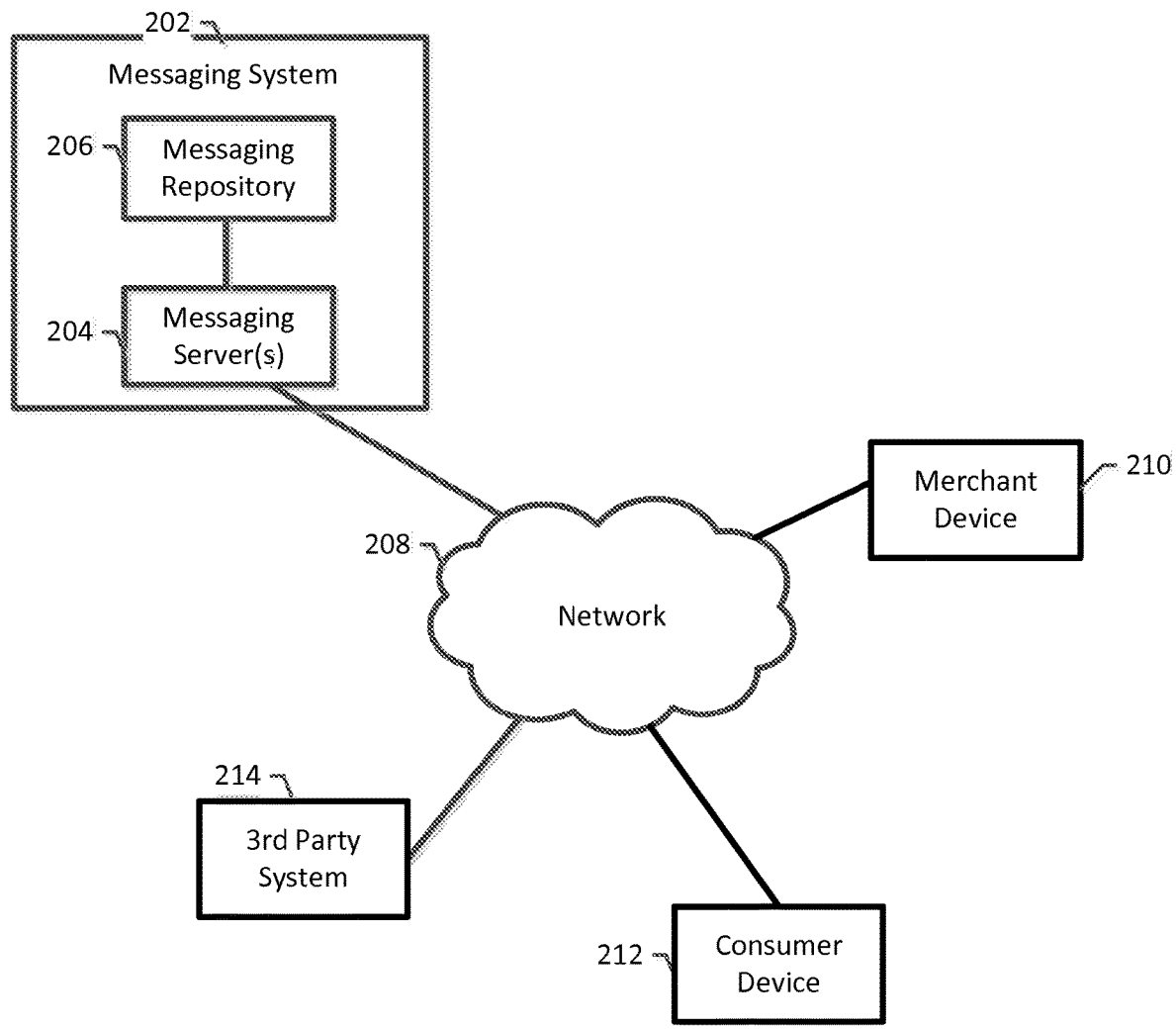
Figure 3:
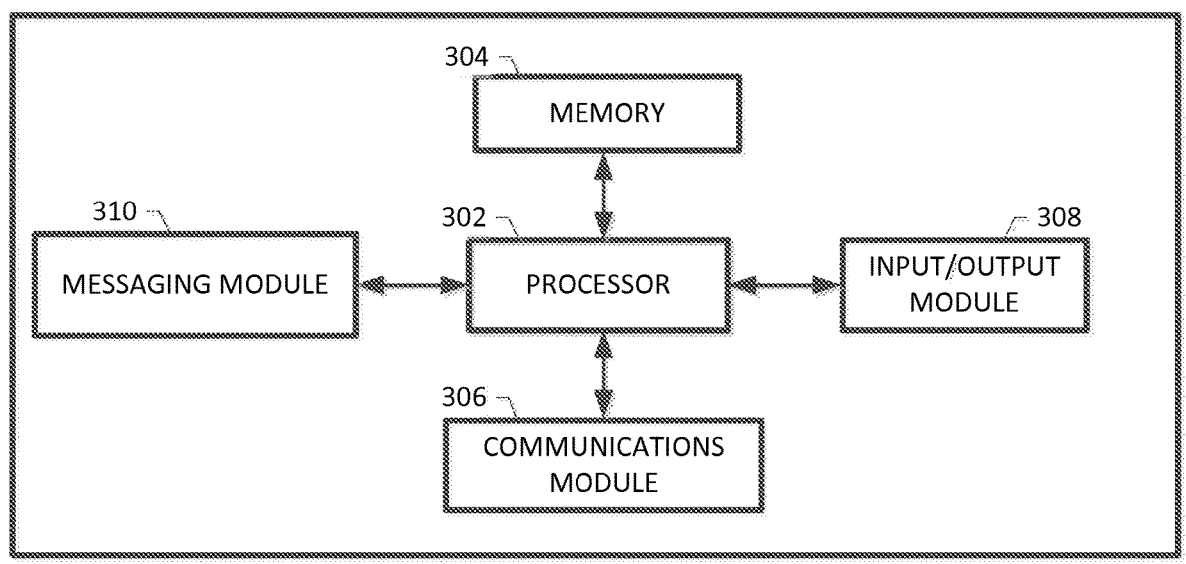
Figure 4:
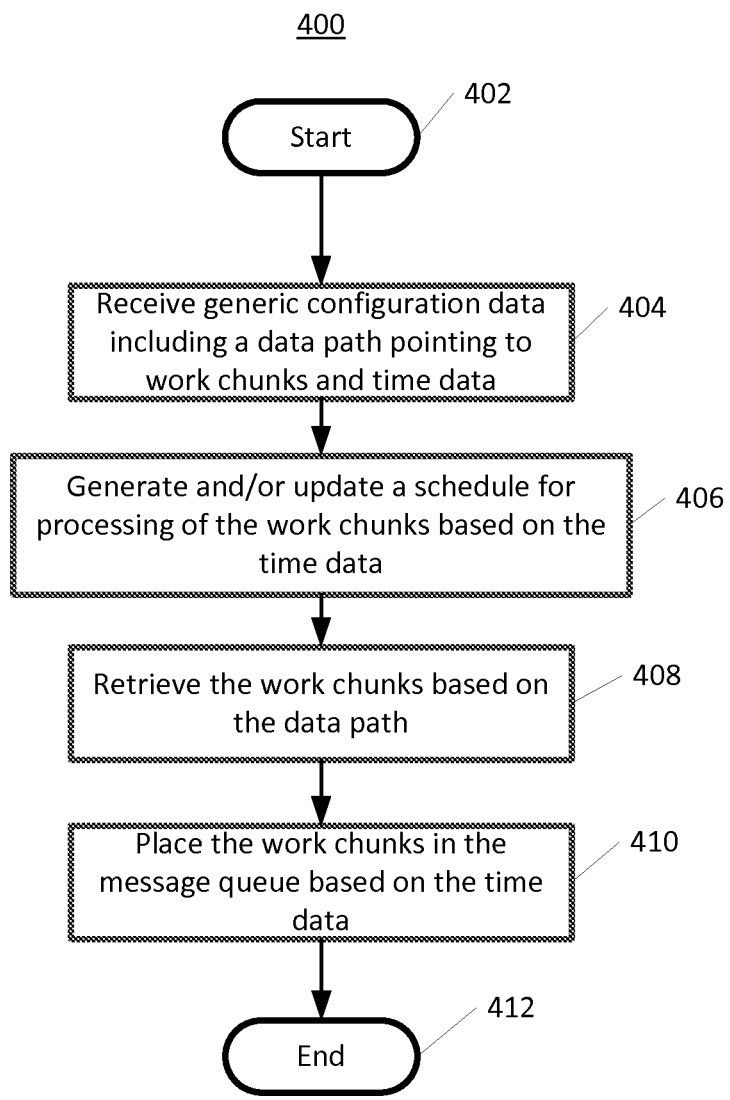
Figure 5:
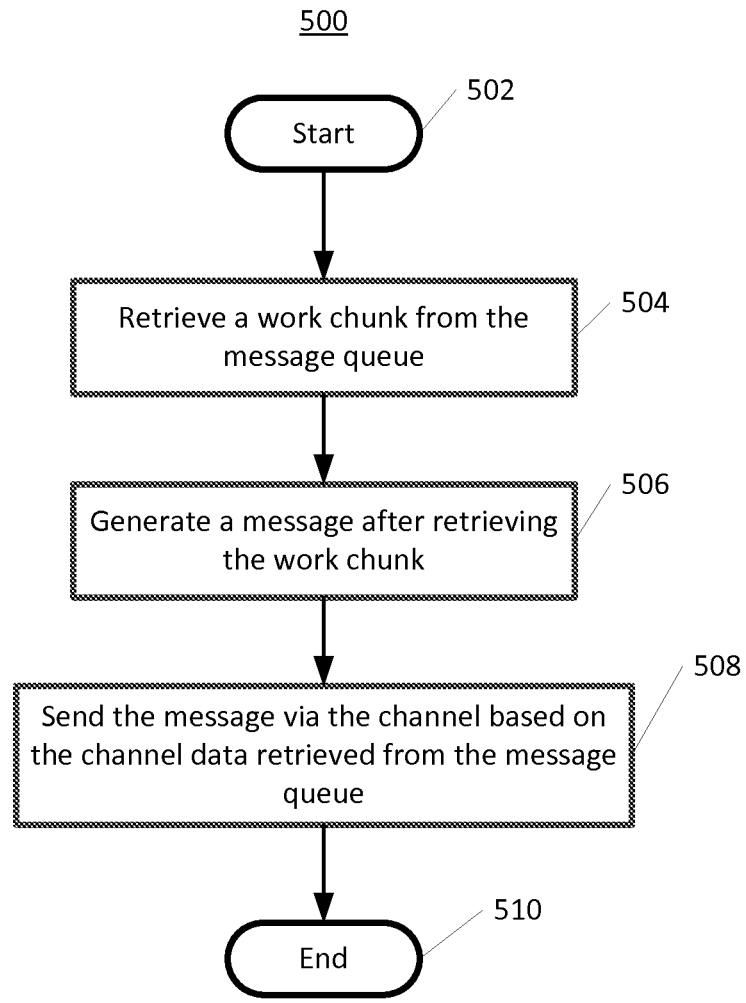
Figure 6:
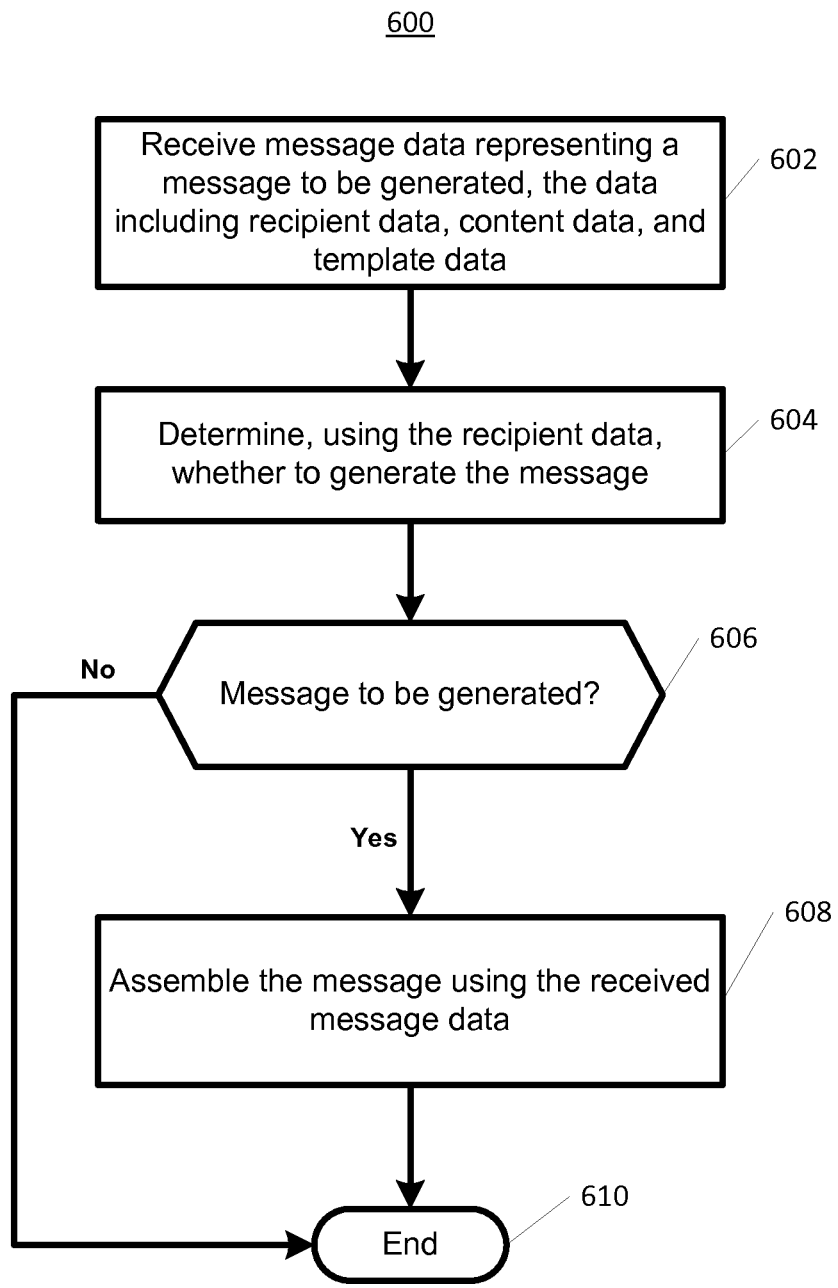
Figure 7:
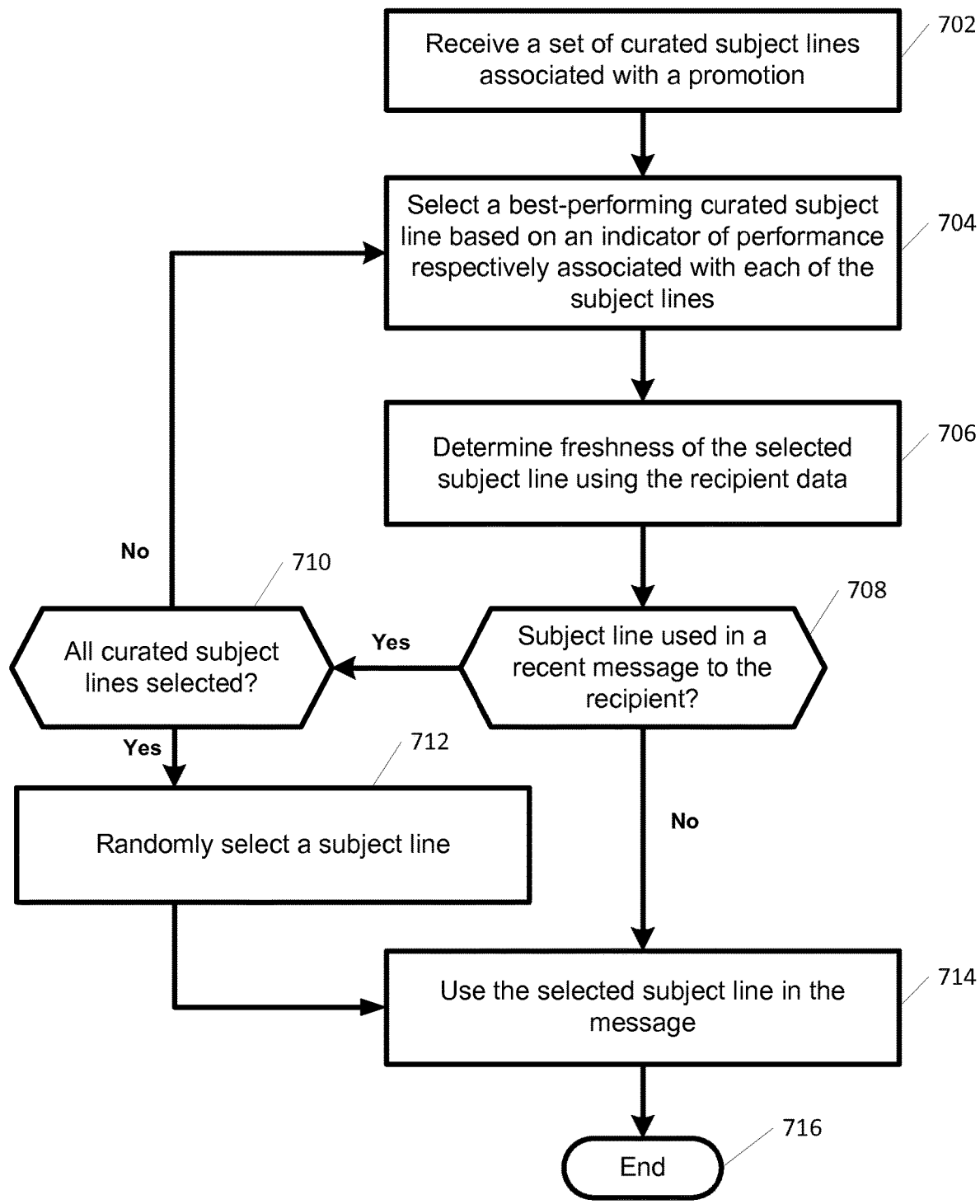
Figure 8:
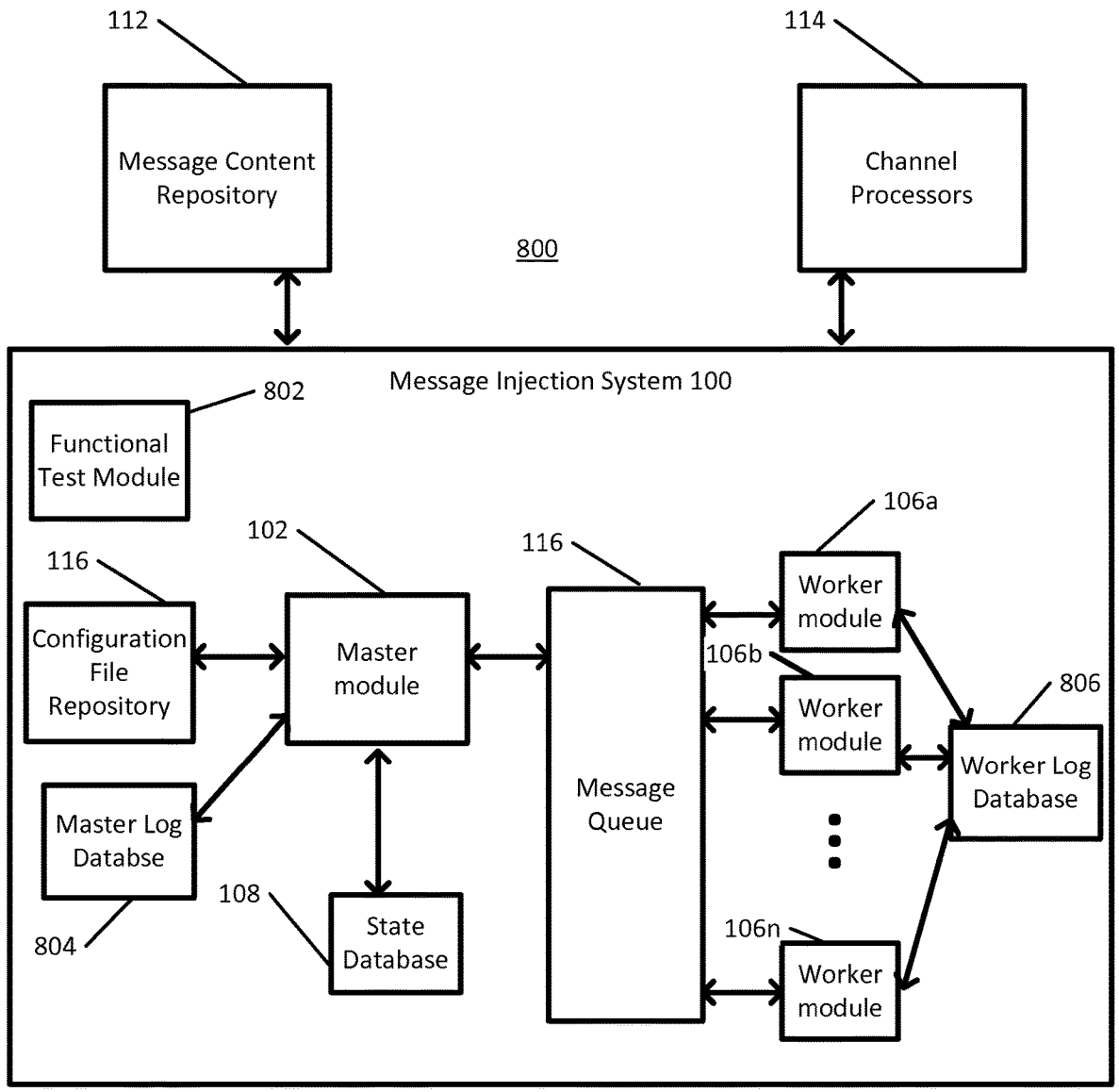
Figure 9:
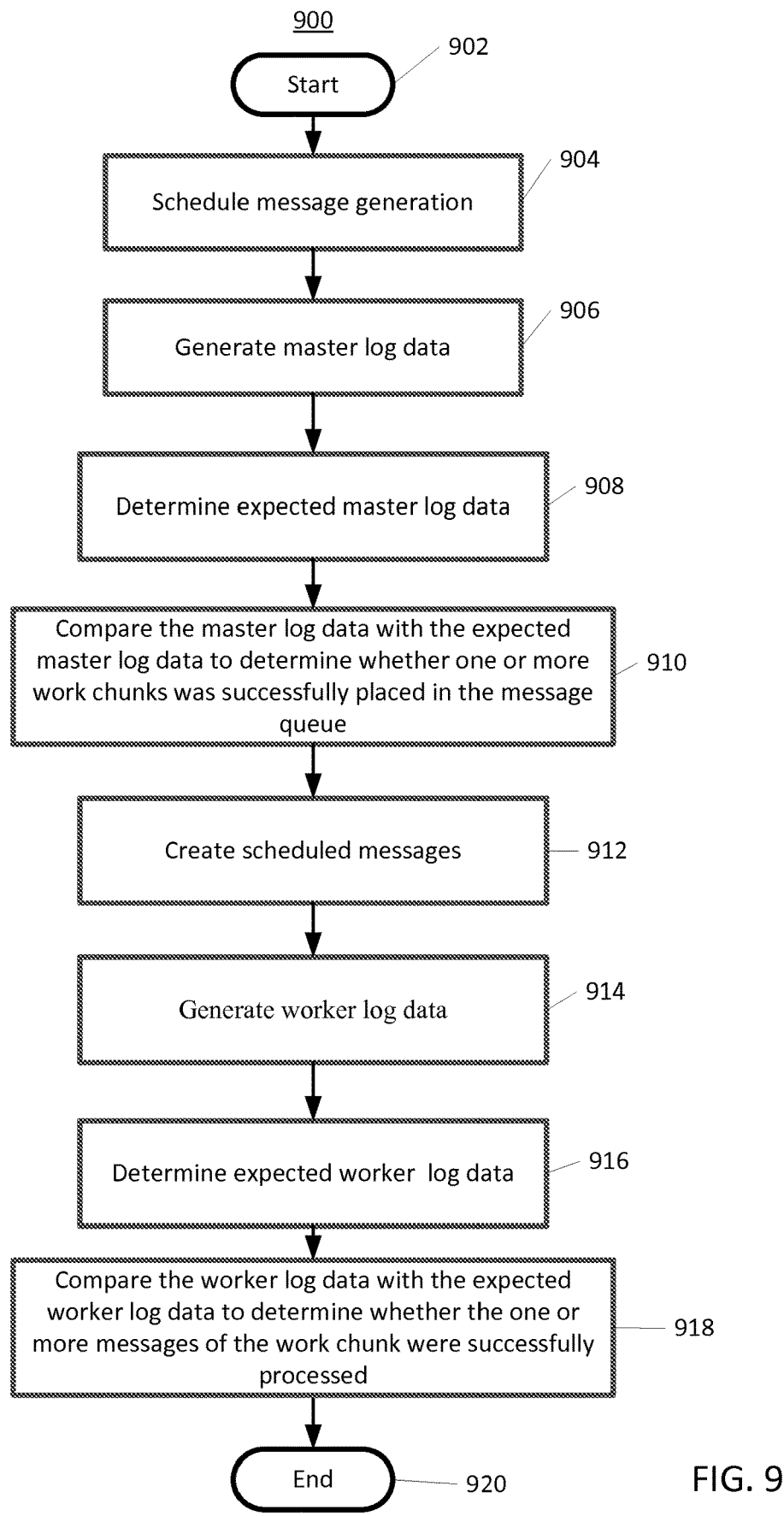

Having thus described some embodiments in general terms, reference will now be made to the accompanying drawings, which are not necessarily drawn to scale, and wherein:

FIG. 1 shows example modules of a messaging system, configured in accordance with some embodiments;

FIG. 2 shows an example system, configured in accordance with some embodiments;

FIG. 3 shows an example schematic block diagram of circuitry configured in accordance with some embodiments;

FIG. 4 is a flow diagram of an example method for scheduling message creation, performed in accordance with some embodiments;

FIG. 5 is a flow diagram of an example method for creating scheduled messages, performed in accordance with some embodiments;

FIG. 6 is a flow diagram of an example method for generating a message for a recipient, performed in accordance with some embodiments;

FIG. 7 is a flow diagram of an example method 700 for generating a subject line in a message intended for a recipient, performed in accordance with some embodiments;

FIG. 8 shows an example functional test system for functional testing, configured in accordance with some embodiments; and FIG. 9 is a flow diagram of an example method for performing a functional test, performed in accordance with some embodiments.

DETAILED DESCRIPTION

Embodiments will be described more fully hereinafter with reference to the accompanying drawings, in which some, but not all embodiments are shown. Indeed, embodiments may be implemented in many different forms and should not be construed as limited to the embodiments set forth herein; rather, these example embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Exemplary System Architecture

FIG. 1 shows the modules of an example message injection system 100, configured in accordance with some embodiments. The modules of message injection system 100 (as well as message content repository 112 and channel processors 114) may represent organized blocks of computing functions as discussed herein, which may be supported by any suitable hardware configured to perform the same functions. For example, message injection system 100 may include one or more processing devices (e.g., servers) and one or more storage devices (e.g., databases, memory, etc.).

Message injection system 100 may include master module 102, message queue 104, worker modules 106 (represented by n worker modules 106a . . . 106n), configuration file repository 116 and state database 108. In some embodiments, master module 102 may communicatively connected with message queue 104, configuration file repository 116 and state database 108. Message queue 104 may be communicatively connected with worker modules 106. Master module 102 and worker modules 106 may be communicatively connected with message content repository 112. Furthermore, worker modules 106 may be communicatively connected with one or more channel processors 114. In some embodiments, message injection system 100 may be connected with a different channel processor 114 for each supported channel and/or message type. For example, one (or more) channel processors 114 may be configured to send email messages while one (or more) other channel processors 114 may be configured to send SMS text messages. In another example, a channel processor 114 may be configured to send messages via different channels or for different message types over the same channel.

Master module 102 may include circuitry configured to receive generic configuration data. For example, the generic configuration data could be received from configuration file repository 116, via user input, and/or from any other computing device. The generic configuration data may be configured to facilitate transmission of a plurality of message types, and as such, may be generic to message types and/or channels. Furthermore, as discussed below in greater detail, the generic configuration data may also be configured to support the generation of messages that include dynamically updated message data, and as such, may be generic as to message content and/or message recipients.

In some embodiments, a set of generic configuration data may include a data path, time data, and channel data for a plurality of messages. The data path may point to work chunks for a plurality of messages stored in message content repository 112. A "work chunk," as used herein, refers to a discrete block of message creation (e.g., of one or more, such as thousands, of messages) that may be performed by the worker modules 106. A work chunk may be configured to facilitate the generation of a subset of the plurality of messages to be sent as indicated by the generic configuration data. In some embodiments, a work chunk may include one or more content data paths that point to message data in message content repository 112. In one example, a work chunk may include a JavaScript Object Notation (JSON) string in which the content data paths, among other things, may be stored in fields.

The message data (e.g., as may be stored in directories referenced by the content data paths) may include content data representing content of the messages (e.g., the promotional offer that is presented in the message) as well as recipient data representing recipients associated with each of the plurality of messages. The recipient data may include consumer identifying data (e.g., name, consumer identifier (e.g., a code), etc.) and/or recipient channel address data (e.g., email address, phone number, social networking username, etc.) for sending a message to the recipient via the channel indicated by the channel data. In some embodiments, the recipient data are stored in a separate recipient data repository.

As discussed above, the generic configuration data may further include time data and/or channel data. The time data of may indicate a message send time at which to initiate the sending of the plurality of messages. In some embodiments, the time data may indicate a recurring message send time, such as an hourly, daily, weekly, monthly, yearly, etc. message send time. The channel data may indicate the message type of the plurality of messages and/or a channel for sending the plurality of messages (e.g., email, social network message, Short Message Service (SMS) text, etc.).

In some embodiments, the generic configuration data may include a message type identifier representing the type of the messages (e.g. email, SMS) that are specified by a particular set of generic configuration data. In embodiments, for example, the system may be configured to use the message type identifier when different types of messages may be sent over the same channel. Additionally and/or alternatively, during work chunk processing, worker modules 106 may be configured to compare the message type identifier with the channel data to determine whether the channel data is suitable for the message type.

In some embodiments, the generic configuration data may further include a template path pointing to template data for the plurality of messages. The template data may provide a template (e.g., a frame, outline, structure, etc.) by which at least a portion of the message data (e.g., as determined by the one or more content data paths in the work chunk) for each message may be formatted or otherwise displayed. In some embodiments, the template data may further provide for an aesthetically pleasing message and/or a message where the contents are strategically located, to enhance consumer interest, message clarity, or the like. In embodiments, the template data may be stored in message content repository 112, and the template path may be configured to point accordingly.

Message content repository 112 may be configured to store the message data and/or template data. In some embodiments, message content repository 112 may be a Hadoop database that uses the Hadoop Distributed File System (HDFS). The message data may be partitioned into HDFS files, where for example, each HDFS file may include the data of a work chunk. The data path of the generic configuration data and/or a generic configuration file may point to multiple HDFS files (e.g., in a directory), each being a work chunk that may be retrieved from message content repository 112 and placed in message queue 104, as discussed in further detail below.

In some embodiments, master module 102 may be configured to process generic configuration data. For example, master module 102 may be configured to schedule processing of the work chunks based on the time data of the generic configuration data. In some examples, the schedule may be maintained in one or more cron table files which may be used as a basis for triggering work chunk processing. Master module 102 may include a clock or other timekeeping device that may be used to compare current time with the time data and/or cron table file. When the work chunks are to be processed, master module 102 may be configured to retrieve the work chunks based on the data path and to store the work chunks in message queue 104. The priority of the work chunks (e.g., relative to other work chunks) within message queue 104 may be determined based on the time data. In some embodiments, master module 102 may be configured to simultaneously process multiple sets of generic configuration data for different promotional offers, advertising campaigns, and/or different merchants. Master module 102 may be configured to schedule, based on the time data for each set of generic configuration data, when work chunks may be processed by worker modules 105.

In some embodiments, each set of generic configuration data may be included in a generic configuration file. Master module 102 may include circuitry configured to receive the generic configuration file (e.g., from configuration file repository 116) that includes the generic configuration data. The generic configuration data and/or generic configuration files may be stored in configuration file repository 116. Master module 102 may monitor configuration file repository 116, which may include querying configuration file repository 116 at scheduled times (e.g., once each minute, hour, day, etc.) and update the schedule and message queue 104 accordingly.

In some embodiments, master module 102 may be further configured to place channel data and/or template data (e.g., as found in the generic configuration data and/or generic configuration file) in message queue 104 based on the time data. For example, channel data and/or template data may be placed in message queue 104 with associations to the work chunks such that they can be used during message creation when the work chunks are processed by worker modules 106. Alternatively and/or additionally, the channel data and/or template data may be included in the work chunks retrieved from message content repository 112 and/or may be added to the work chunks by master module 102 when the work chunks are placed in message queue 104.

Message queue 104 may be configured to act as storage for work chunks that are to be processed, where worker modules 106 may be configured to take work chunks from message queue 104 for processing. In some embodiments, a worker module 106 with available computing resources (e.g., a thread) may be configured to take a work chunk from the message queue 104 and to process the work chunk in a thread. Once a work chunk is taken for processing by a worker, message queue 104 may be configured to discard or otherwise ensure that the same work chunk is not processed in duplicate by a second worker module 106.

In some embodiments, message queue 104 may be organized as a plurality of separate message queues. For example, a particular message queue may be configured to contain work chunks that specify a particular message type and/or channel, and a message queue 104 may be configured to include a plurality of separate message queues respectively configured for email, social networking and/or SMS texts. The separate message queues may also include different priority levels for worker modules 106. The separate message queues may be weighted such that worker modules 106 may be configured to take work chunks from message queue 104 according to a distribution indicated by the weighting. For example, an 80-10-10 distribution for email, social networking message and SMS text, respectively, may cause a worker module 106 to dedicate 80% of its computing resources (e.g., threads) to email, 10% to social networking message and 10% to SMS text. As such, a particular worker module 106 may be configured to take work chunks from message queue 104 in a manner that best preserves the specified weighting. In another example, one or more of worker modules 106 may be configured to be dedicated worker modules, each worker module respectively being associated with a particular separate message queue, channel and/or message type.

As discussed above, work chunks placed in message queue 104 may not contain the message data, but instead, may include the one or more content data paths that point to message data. As such, the message data may be updated in message content repository 112 to generate messages with updated content and/or for updated recipients without any changes to generic configuration data, master module 102 and/or message queue 104. One advantage that may be provided in such embodiments may include allowing dynamic updates to message content and/or recipients up to the time of message creation (e.g., when the message data is retrieved based on the one or more content data paths of work chunks in message queue 104. As such, new or updated marketing campaigns, promotional offers and/or other communications may be generated on demand by changing message data in message content repository 112, such as in response to changing market conditions of merchants on an hourly, daily, monthly, yearly, etc. basis. For example, message data may be updated to generate promotional offer for a discount on a product or service when a merchant has excess of supply on a particular day. In another example, a promotional offer may be generated with a time constraint (e.g., discount for lunch) to enhance merchant activity level at a targeted time. In a third example, a promotional offer may be quickly discontinued, such as when a merchant has run out of supply for a particular product or service or as otherwise desired by the merchant.

In some embodiments, the content data paths in the work chunks that point to message data may point to directories containing the message data. The content data paths may be dynamically updated based on the time data and/or schedule such that different directories, and therefore different message data, may be referenced at different times. For example, message content repository 112 may include message data directories referenced by corresponding time data (e.g., time of day, calendar date, etc.). Master module 102 may be configured to incorporate or otherwise modify the content data paths with the time and/or schedule such that the appropriate message data is retrieved for message creation. In some embodiments, master module 102 may be configured to dynamically update the data path in the generic configuration data pointing to work chunks. The data path may also be dynamically updated based on the time data such that different directories of work chunks, and therefore different work chunks, may be referenced at different times. For example, message content repository 112 may include work chunk directories referenced by the time data. Here, master module 102 may be configured to incorporate or otherwise modify the data path with the time data such that the appropriate work chunks may be retrieved for message creation. In another example embodiment, the message data in message content repository 112 may be updated (e.g., at message content repository 112) without updating the data path and/or content data paths.

Worker modules 106 (indicated in FIG. 1 as worker modules 106*a*-106*n*, may be configured to process a work chunk using one or more threads of computing resource (e.g., processor(s) and memory storing instructions executable by the processor(s)). In embodiments, a worker module 106 may be configured to retrieve a work chunk from message queue 104 when a thread becomes available for processing.

In some embodiments, worker module 106 may be configured to generate a message after retrieving the work chunk. As discussed above, the timing of message generation may be determined by master module 102 that places work chunks in message queue 104 based on the time data and/or cron table file. The message may include at least a portion of the content data retrieved from message content repository 112 based on the message data path in the work chunk that points to the message data. In some embodiments, at least a portion of the retrieved message data (e.g., the content, consumer identifying data, and/or recipient channel address data) may be formatted as specified by template data retrieved based on the template path retrieved from message queue 104.

Upon generating the message, worker module 106 may be further configured to send the message via the channel based on the channel data retrieved from message queue 104. For example, the message may be sent to an appropriate channel processor 114 that is configured to send the message over the channel. Although some example channels may include email, social network message, mobile applications, and SMS text, virtually any other type of electronic communication channel could be used by adding and/or modifying a channel processor 114. In some embodiments, the message may be sent to a consumer via a consumer device, which may be a mobile device (e.g., a smartphone, cellular phone, tablet, laptop, etc.) or a stationary device (e.g., a workstation, desktop, computing device, etc.). Alternatively and/or additionally, the message may be sent to a merchant via a merchant device, which may also be a mobile device or a stationary device.

FIG. 2 shows an example system 200 including an example network architecture, which may include one or more devices and sub-systems that are configured to implement some embodiments discussed herein. For example, system 200 may include messaging system 202, which can include, for example, messaging server(s) 204 and messaging repository 206, among other things (not shown). Messaging server 204 may be any suitable network server, a plurality of networked servers, and/or other type of processing device. In some embodiments, one or more messaging servers 205 may be configured to implement the functions described herein with respect to master module 102, message queue 104, worker modules 106 and/or channel processors 104 as shown in FIG. 1. Messaging repository 206 may be any suitable network database configured to store information that may be used to facilitate the techniques as discussed herein. In some embodiments, one or more message databases 206 may be configured to implement the functions described herein with respect to message content repository 112, configuration file repository 116 and/or state database 108 shown in FIG. 1. In this regard, system 200 may include, for example, at least one backend data server, network database, cloud computing device, among other things.

Central system 200 may be coupled to one or more merchant devices 210, third party systems 214 and consumer devices 212 via network 208. In this regard, network 208 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware configured to implement it (such as, e.g., network routers, etc.). For example, network 208 may include a cellular telephone, an 802.11, 802.16, 802.20, and/or WiMax network. Further, the network 208 may include a public network, such as the Internet, a private network, such as an intranet, or combinations thereof, and may utilize a variety of networking protocols now available or later developed including, but not limited to TCP/IP based networking protocols.

Merchant devices 210 may be associated with one or more merchants, such as a retail store, restaurant, etc. In some embodiments, merchant device 210 may be a point-of-sale (POS) device that is configured to receive payments at the merchant's shop. As such, merchant device 210 may include a personal computer and/or other networked device, such as a cellular phone, tablet computer, mobile device, etc., that may be used for any suitable purpose (e.g., in addition to providing POS functionality).

System 200 may further include one or more consumer devices 212. In some embodiments, messaging system 202 may be configured to send messages of a plurality of message types and/or channels to consumer devices 212 via network 208. As discussed above, a consumer device 212 may be a mobile or stationary device of a consumer. In some embodiments, consumer device 212 may further include payment capability and/or promotional offer redemption capability. For example, when a promotional offer is sent to the consumer device via a message as described herein, the consumer device may be configured to allow a consumer to purchase or otherwise accept the promotional offer. In some embodiments, the consumer device may be configured to interface with the merchant device (e.g., via network 208 and/or a separate proximity-based connection, such as a personal area network (PAN) to receive messages generated by messaging system 202 and/or for seamless redemption of promotional offers. For example, when a promotional offer specifies for a discount on a product, consumer device 212 may be configured to provide payment to merchant device 210 for the product's price less the discount value. Additional details regarding promotional offers and seamless redemption via consumer device, applicable to some embodiments, is discussed in greater detail in U.S. Provisional Patent Application No. 61/715,229, titled "Peer-To-Peer Payment Processing," and U.S. Provisional Patent Application No. 61/715,230, titled "Consumer Presence Based Deal Offers," which are each hereby incorporated by reference in their entirety.

In some embodiments, system 200 may further include one or more third party systems 214, among other things. For example, a third party system 214 may be configured to provide social networking services. As such, messaging system 202 may be configured to send social networking messages to third party system 214, which may then be sent to consumer device 212 from third party system 214. In another example, a third party system 214 may be associated with a payment account, bank account, checking account, In some embodiments, messaging system 202 may be a multi-tenant database system configured to provide services (e.g., messaging) to a plurality of consumers and merchants. In some embodiments, messaging system 202 may be configured to include, or work in connection with, a marketing system, payment processing system, coupon provider system, and/or any other type of promotional system controlled by a merchant, third party and/or any other type of user (e.g., such as hardware provider, software application developer, online retailer, brick-and-mortar retailer, etc.). Messaging system 202 may be accessible via one or more computing devices and may be operable to provide example promotion and/or marketing services on behalf of one or more providers that are offering one or more vouchers that are redeemable for goods, services, experiences and/or the like. In some embodiments, messaging system 202 may be further configured to illustrate or otherwise inform (e.g., via the messages discussed herein) one or more consumers of the availability of one or more vouchers (e.g., deals) in the form of one or more offers. In some examples, the messaging system 202 may also take the form of a redemption authority or payment processor, it may provide rewards indications and/or it may function as an entity within a financial network. As such, the messaging system 202 is, in some example embodiments, configured to present one or more offers, accept payments for offers from both merchants and consumers, upon acceptance of an offer, issue vouchers, indicate whether a voucher is valid for the purpose of redemption, generate rewards, provide a point of sale device or otherwise participate in the exchange of goods, services or experiences for currency and/or the like. Additional details regarding promotional systems, applicable to some embodiments, are discussed in greater detail in U.S. Provisional Patent Application No. 61/715,229, titled "Peer-To-Peer Payment Processing," and U.S. Provisional Patent Application No. 61/715,230, titled "Consumer Presence Based Deal Offers," each incorporated by reference herein, and U.S. patent application Ser. No. 13/764,753, titled "Consumer Device Payment Token Management," which is hereby incorporated by reference in its entirety.

FIG. 3 shows a schematic block diagram of circuitry 300, some or all of which may be included in, for example, messaging system 202, consumer device 212, and/or merchant device 214. In accordance with some example embodiments, circuitry 300 may include various means, such as one or more processors 302, memories 304, communications modules 306, and/or input/output modules 308.

In some embodiments, such as when circuitry 300 is included in merchant device 210 and/or messaging system 202, messaging module 310 may also or instead be included. As referred to herein, "module" includes hardware, software and/or firmware configured to perform one or more particular functions. In this regard, the means of circuitry 300 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 304) that is executable by a suitably configured processing device (e.g., processor 302), or some combination thereof.

Processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments, processor 302 may comprise a plurality of processors. The plurality of processors may be embodied on a single computing device or may be distributed across a plurality of computing devices collectively configured to function as circuitry 300. The plurality of processors may be in operative communication with each other and may be collectively configured to perform one or more functionalities of circuitry 300 as described herein. In an example embodiment, processor 302 may be configured to execute instructions stored in memory 304 or otherwise accessible to processor 302. These instructions, when executed by processor 302, may cause circuitry 300 to perform one or more of the functionalities related to message generation (e.g., as described herein for master module 102 and/or worker modules 106 of message injection system 100).

Whether configured by hardware, firmware/software methods, or by a combination thereof, processor 302 may comprise an entity capable of performing operations according to embodiments of the present invention while configured accordingly. Thus, for example, when processor 302 is embodied as an ASIC, FPGA or the like, processor 302 may comprise specifically configured hardware for conducting one or more operations described herein. As another example, when processor 302 may be embodied as an executor of instructions, such as may be stored in memory 304, the instructions may specifically configure processor 302 to perform one or more algorithms, methods or operations described herein.

Memory 304 may comprise, for example, volatile memory, non-volatile memory, or some combination thereof. Although illustrated in FIG. 3 as a single memory, memory 304 may comprise a plurality of memory components. The plurality of memory components may be embodied on a single computing device or distributed across a plurality of computing devices. In various embodiments, memory 304 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 304 may be configured to store information, data, applications, instructions, or the like for enabling circuitry 300 to carry out various functions in accordance with example embodiments discussed herein. For example, in at least some embodiments, memory 304 may be configured to buffer input data for processing by processor 302. Additionally or alternatively, in at least some embodiments, memory 304 may be configured to store program instructions for execution by processor 302. Memory 304 may store information in the form of static and/or dynamic information. This stored information may be stored and/or used by circuitry 300 during the course of performing its functionalities.

Communications module 306 may be embodied as any device or means embodied in circuitry, hardware, a computer program product comprising computer readable program instructions stored on a computer readable medium (e.g., memory 304) and executed by a processing device (e.g., processor 302), or a combination thereof that is configured to receive and/or transmit data from/to another device, such as, for example, a second circuitry 300 and/or the like. In some embodiments, communications module 306 (like other components discussed herein) can be at least partially embodied as or otherwise controlled by processor 302. In this regard, communications module 306 may be in communication with processor 302, such as via a bus. Communications module 306 may include, for example, an antenna, a transmitter, a receiver, a transceiver, network interface card and/or supporting hardware and/or firmware/software for enabling communications with another computing device. Communications module 306 may be configured to receive and/or transmit any data that may be stored by memory 304 using any protocol that may be used for communications between computing devices. Communications module 306 may additionally or alternatively be in communication with the memory 304, input/output module 308 and/or any other component of circuitry 300, such as via a bus.

Input/output module 308 may be in communication with processor 302 to receive an indication of a user input and/or to provide an audible, visual, mechanical, or other output to a user. Input/output module 308 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 300 may be implemented as a server or database, aspects of input/output module 308 may be reduced as compared to embodiments where circuitry 300 may be implemented as an end-user machine (e.g., consumer device 210 and/or merchant device 212) or other type of device designed for complex user interactions. In some embodiments (like other components discussed herein), input/output module 308 may even be eliminated from circuitry 300. Alternatively, such as in embodiments wherein circuitry 300 is embodied as a server or database, at least some aspects of input/output module 308 may be embodied on an apparatus used by a user that is in communication with circuitry 300, such as for example, merchant device 210, consumer device 212 and/or a control console for messaging server(s) 204. Input/output module 308 may be in communication with memory 304, communications module 306, and/or any other component(s), such as via a bus. Although more than one input/output module and/or other component can be included in circuitry 300, only one is shown in FIG. 3 to avoid overcomplicating the drawing (like the other components discussed herein).

In some embodiments, messaging module 310 may also or instead be included and configured to perform the functionality discussed herein related to generating messages. In some embodiments, some or all of the functionality for generating messages may be performed by processor 302. In this regard, the example processes and algorithms discussed herein can be performed by at least one processor 302 and/or messaging module 310. For example, non-transitory computer readable storage media can be configured to store firmware, one or more application programs, and/or other software, which include instructions and other computer-readable program code portions that can be executed to control processors of the components of system 300 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiment may be configured as methods, mobile devices, backend network devices and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 302, to produce a machine, such that the computer program product includes the instructions which execute on the computer or other programmable data processing apparatus create a means for implementing the functions specified in the flowchart block or block diagrams.

These computer program instructions may also be stored in a computer-readable storage device (e.g., memory 304) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Generating Messages

FIG. 4 shows an example of a method 400 for scheduling message generation, performed in accordance with some embodiments. Method 400 may be performed by any suitably configured computing device. In some embodiments, method 400 may be performed by master module 102 of message injection system 100, as shown in FIG. 1. Alternatively and/or additionally, method 400 can be performed by merchant device 210 (e.g., by a master module) and/or messaging system 202, as shown in FIG. 2. To avoid unnecessarily overcomplicating the disclosure, method 400 is described as being performed with the components shown in FIG. 1, such as master module 102, message content repository 112, message queue 104 and/or configuration file repository 116.

In embodiments, the master module 102 uses generic configuration data to facilitate transmission of messages of different message types (e.g., email, social networking message, mobile app notifications, SMS text, instant messenger, chat room, etc.). In embodiments, the generic configuration data is stored in a configuration file repository 116. In embodiments, master module 102 may be configured to query or otherwise synchronize with the configuration file repository 116 at scheduled times (e.g. once each minute, hour, day) to receive updates to stored generic configuration data.

Method 400 may begin at 402, and proceed to 404, where the master module 106 may receive generic configuration data from configuration file repository 116. In some embodiments, generic configuration data may include a data path, time data, channel data and/or a template path. The data path may point to work chunks for the plurality of messages in a message content repository, such as message content repository 112. The time data may indicate a message send time at which to initiate the sending of the plurality of messages. The channel data may indicate a message type of the plurality of message types and a channel for sending the plurality of messages. In some embodiments, the channel data may further include a message type identifier that indicates the message type. The template path may point to template data for the plurality of messages. In embodiments, the template data may also be stored in the configuration file repository 116 with the template path configured to point accordingly.

At 406, the master module may be configured to generate and/or update a schedule for processing of the work chunks based on the time data. As discussed above, the work chunks and the time data may be determined based on the generic configuration data. The schedule may include work chunks as indicated by some or all of the generic configuration files in the configuration file repository. In some embodiments, the schedule may be maintained in one or more cron table files which may be used as a basis for triggering work chunk processing. The master module may include a clock or other timekeeping device capable of determining the time. The determined time may be compared with the schedule as a basis for triggering message generation such that messages may be sent out as indicated by the time data.

At 408, the master module may be configured to retrieve the work chunks based on the data path (e.g., as indicated by the generic configuration data). The work chunks may be retrieved, for example, from the message content repository. As discussed above, each work chunk may facilitate the generation of some (e.g., a subset) of the plurality of messages and may include one or more content data paths pointing to message data (e.g., message content and/or recipient data) in the message content repository.

In some embodiments, the data path that points to the work chunks may be further configured to point to a success file (e.g., in the message content repository). For example, the success file may be in the same directory within the message content repository as the work chunks. The success file may be configured to indicate the end of a listing of the work chunks. As such, upon retrieving the work chunks, the master module may further confirm that following the data path resulted in the correct number of work chunks being found.

At 410, the master module may be configured to place the work chunks in the message queue based on the time data. For example, the work chunks may be placed in the message queue as indicated by the schedule generated based on the time data. In some embodiments, the channel data and/or template path may also be placed in the message queue based on the time data. For example, channel data and/or template path may be placed in the message queue in association with the work chunks such that all of the data may be retrieved together. In some embodiments, additional metadata about work chunks may also be placed in the message queue such as a chunk identifier, a message type, etc. In another example, the work chunk may include and/or may be configured to point to the channel data and/or template path. Here, the work chunks may be placed in the message queue without further placing the channel data and/or template path in the message queue.

Via the monitoring for updates to generic configuration data, the master module may be configured to detect and/or receive additional generic configuration data (or files) at virtually any time. For example, the master module may receive second generic configuration data that may include a second data path and second time data, among other things (e.g., similar to the description above at 406). The master module may then retrieve second work chunks based on the second data path, place the second work chunks in the message queue based on the second time data, etc. Placing the work chunks in the message queue may be performed based on an order indicated by time data in each of the generic configuration data (or files files). Method 400 may then end at 412.

FIG. 5 shows an example of a method 500 for creating scheduled messages, performed in accordance with some embodiments. Method 500 may be performed after method 400, such as by any suitably configured computing device, which may be the same or a different computing device than the computing device that performed method 400. In some embodiments, method 500 may be performed by one of worker modules 106 of message injection system 100, as shown in FIG. 1. In some embodiments, each of worker modules 106a-106n may be configured to perform method 500 in parallel. Alternatively and/or additionally, method 500 can be performed by merchant device 210 (e.g., by a master module) and/or messaging system 202, as shown in FIG. 2. To avoid unnecessarily overcomplicating the disclosure, method 500 is described as being performed with the components shown in FIG. 1, such as worker modules 106, message content repository 112, message queue 104 and/or channel processors 114.

Method 500 may begin at 502, and proceed to 504, where a worker module may be configured to retrieve a work chunk from the message queue. As discussed above, work chunks may be placed in the message queue (e.g., by the master module) based on the time data and/or a schedule determined based on the time data. In some embodiments, each worker module 106a-106n may include a plurality of threads or computing resources that may execute concurrently, where each thread may be configured to process a work chunk. The worker module may be configured to retrieve a work chunk from the message queue upon having available computing resources. As discussed above, however, techniques including separate message queues (weighted or otherwise) and/or dedicated worker modules assigned to particular separate message queue, channel and/or message type may be used in various embodiments.

At 506, the worker module may be configured to generate a message for a recipient after retrieving the work chunk. A message to be generated may include recipient data and content data that are retrieved from the message content repository by using the content data path in the work chunk. As discussed above, because the content data path is a pointer to a directory where data are stored and not the data itself, the data in the message content repository may be updated at any time up to when the worker module retrieves the data from the message content repository at 506.

As such, some embodiments may allow for rapid deployment of new or updated promotional offers, targeted advertisements, etc. following the time of creation (e.g., when they are placed in the message content repository as message data). Content data may be updated at any time in response to quickly breaking events, current market conditions (e.g., with granularity to the local and/or sector levels), merchant inventories, supply levels, reservation book availability, restaurant and/or seating availability, venue ticket supply, etc. In embodiments, recipient data representing one or more recipients of a communication, including recipient channel address data, also may be dynamically updated.

At 510, the worker module may be configured to send the message via the channel based on the channel data retrieved from the message queue. For example, the message may be sent to one or more of channel processors 114, as shown in FIG. 1. As discussed above, some example channels may include email, social network message, mobile applications, and SMS text. In an example where the channel is email, the channel processor may include a send engine configured to receive messages (e.g., form the worker modules) and to push the messages out to email provider systems. In some embodiments, each channel processor may be server configured to send out numerous (e.g., millions) of messages each day via its channel. In another example, the channel processor may be configured to access a particular channel using an API provided by a third party.

In some embodiments, the worker module may be configured to ensure that the channel data is not null or otherwise references a support channel. If the channel data is null, for example, the message may be generated, but not sent. As discussed in greater detail below, null channel data may be used to perform testing (e.g., without actually sending test messages). Method 500 may end at 510.

FIG. 6 is a flow diagram of an example method 600 for generating a message for a recipient. For convenience, the method 600 will be described with respect to a system that includes one or more computing devices and performs the method 600. Specifically, the method 600 will be described with respect to the implementation of step 506 in method 500 by a worker module 106 in message injection system 100.

In embodiments, the system receives 602 message data that describes the message to be generated. In embodiments, the message data includes recipient data representing the intended recipient of the message, content data that describe the content of the message, and template data that describe the presentation of the message content.

In embodiments, the system determines 604 whether to generate the message based in part on the recipient data. In various embodiments, the system bases this determination based on one or a combination of several processes. These processes will be described in terms of handling email messages for clarity but without limitation of the scope of the invention.

In some cases, a recipient email address does not represent valid recipients for generated messages (e.g. email addresses that are used as spam traps). In some embodiments, the system maintains a blacklist of invalid email addresses that do not represent desired recipients for email messages. In embodiments, the system will search the blacklist to determine if the email address associated with the recipient matches at least one invalid email address in the blacklist. If a match is determined, the system will not generate the message and the process ends 610.

In embodiments, an invalid email address blacklist includes one or more wildcard entries that each represents a block of related email addresses. A wildcard entry includes a wildcard identifier character to indicate that all strings will match the character. For example, a wildcard identifier character may be "*", and a single wildcard entry that matches all email addresses associated with "domain.com" would be represented on the blacklist as "*@domain.com".

There are some cases in which an email address is valid, but it is associated with a non-responsive recipient who has not opened and/or not responded to previous emails sent to the address. In such cases, the system suppresses the generation of new messages to these recipients. In embodiments, the system determines such a non-responsive recipient by analyzing historical recipient response behavior that has been collected. In some embodiments, the system identifies a non-responsive recipient by adding a flag to the recipient data associated with the recipient. Additionally and/or alternatively, in some embodiments the system adds the recipient's email address to a suppression list.

In embodiments, the system uses the recipient data to determine whether the recipient represents a non-responsive recipient. If a determination is made, the system will not generate the message and the process ends 610.

There are some cases in which the system determines whether to continue generating messages for a recipient based on whether previous emails sent to the recipient have bounced (i.e. been returned from the recipient's mail system). A bounce may be a temporary failure (i.e. a soft bounce) or a permanent failure (i.e. a hard bounce). Examples of hard bounces include unknown or invalid user and unknown mailbox. Examples of soft bounces include a vacation message, a full mailbox, a status message indicating too much email traffic to handle, and a reputation problem causing all emails from the sender to be blocked.

In embodiments, if the system receives status that a hard bounce has returned from a particular email address, the system immediately will stop generating emails to that email address. If the system receives status that a soft bounce has returned from a particular email address, the system may one of a variety of actions depending on the type of soft bounce received. For example, the system may continue to send emails to an address that returns a mailbox full soft bounce, but if such soft bounces are received more than ten times in the next fifteen days, the system will stop sending emails to the address. In another example, a soft bounce due to too much email traffic is related to the recipient's mail system and not to the recipient, so the system may respond to the soft bounce by continuing to send emails to the email address but throttle back the rate of email messages sent to that mail system. In yet another example, a system may respond to a soft bounce due to a reputation problem by taking action to resolve the problem while continuing to send messages to the recipient.

If the system determines 606 that a message will be generated, the system assembles 608 a message based on the received message data. In some embodiments, message content data may be formatted as specified by template data. As discussed above, a template data path may be placed in the message queue and/or otherwise associated with the work chunk retrieved at 504. The template data may be retrieved (e.g., from the master content repository or some other data storage) based on the template path retrieved from the message queue.

Also as discussed above, the template data may provide a frame, outline, structure, etc. by which at least a portion of the content data may be formatted or otherwise displayed. For example, if the channel and/or message type is email, the message data for an email message may provide data for a subject line, body text, and HyperText Markup Language (HTML) content (e.g., including images, videos, interactive interfaces, login displays, etc). The template data may provide for the structure of the email in which the message data may be placed.

In some embodiments, the message content may be customized for a particular recipient based on the received recipient data. For example, the message content within the subject line, body text, and/or HTML content may be designed to be particularly relevant (e.g., based on interests, location, purchase history, browsing history, etc.) to the recipient. Furthermore, recipient data (e.g., name) may be included within the subject line, body text, and/or HTML content to further personalize the message.

The process ends 610 after the message is assembled.

FIG. 7 is a flow diagram of an example method 700 for generating a subject line in a message intended for a recipient. For convenience, the method 700 will be described with respect to a system that includes one or more computing devices and performs the method 700. Specifically, the method 700 will be described with respect to the implementation by a worker module 106 of step 608 in method 600.

In embodiments, the system receives 702 a set of curated subject lines that are associated with a promotion being represented in the content of a message that is being assembled. In some embodiments, data representing a promotion include one or more descriptors that are associated with the promotion and with the promotion category to which the promotion belongs. One or more of these descriptors are assembled into a possible subject line to use for message content describing the promotion. For example, a possible subject line format could be "<amount>for <service offered>at <merchant>located in <city>" that may be assembled for a message about a particular promotion as "$7 for food and drink at Joe's Pizza in San Francisco" using descriptors associated with both the particular promotion and its promotion category.

In embodiments, a curated set of possible subject lines to use in messages about a promotion is generated and associated with the promotion. As messages about the promotion are assembled and sent to recipients, data describing recipient response behavior to the messages is collected. Examples of response behavior include whether a recipient opens a message, how much time elapses between when a message is received and when it is opened (open rate), and whether the recipient interacts with the message content (e.g. clicks on a link included in the message) after opening the message (click rate).

In embodiments, at least some of the collected data describing recipient response behavior is used to determine which curated subject lines are the best performing subject lines (i.e., a received message using one of those subject lines is more likely to be opened by the recipient). For example, in embodiments, each subject line is associated with a score that is calculated based on the open rate and the click rate of messages containing the subject line. The associated score is used to determine the relative performance of the subject line.

In embodiments, the system selects 704 a best-performing subject line from the received set of curated subject lines based on an indicator of performance respectively associated with each subject line. In embodiments, the indicator of performance is a score calculated using the collected historical data describing recipient response behavior. If little to no recipient data has been collected (e.g. the promotion is newly featured and messages have yet to be sent), the system selects a curated subject line from the set of subject lines at random.

In embodiments, the recipient data stored by the system includes historical data describing the message content of messages sent to each recipient. Over use of a particular subject line will make a recipient less likely to open a new message using that subject line. In embodiments, the system determines 706 the freshness of the selected curated subject line for a recipient by using the recipient data to determine how recently the selected subject line was used in a message sent to the recipient. If the subject line was not used in a recent message to the recipient 708, the system uses 714 the selected subject line in the message being generated and the process ends 712.

If the subject line was used in a recent message sent to the recipient, the system repeats steps 704 and 706 until either a fresh subject line is selected 708 or until the freshness of each of the curated subject lines has been determined 710.

In embodiments, the system may either then select 712 a subject line at random from the set of curated subject lines or, alternatively, assemble a new subject line that is not on the curated list of subject lines. In embodiments, the system uses 714 the randomly selected subject line in the message being generated and the process ends 712.

Functional Testing

In some embodiments, the messaging system may be configured to provide for functional testing of message creation. The functional testing may be performed, for example, with the same computing device(s) that performs message creation (e.g., in a production and/or performance test environment). Additionally and/or alternatively, the computing device may be separate, such as a workstation configured to simulate the message creation functional and/or physical architecture (e.g., as shown in FIGS. 1, 2 and/or 3).

FIG. 8 shows an example functional test system 800 for functional testing, configured in accordance with some embodiments. Functional test system 800 may be similar to message injection system 100, as described above in connection with FIG. 1. Functional test system 800 may be also in communication with message content repository 112 and/or channel processors 114, which like the other components shown in FIG. 8, may be the same or different from corresponding components in the production and/or performance test environment in various embodiments.

In some embodiments, functional test system 800 may further include functional test module 802, master log database 804 and worker log database 806. Functional test system 800 may be configured to perform the functionalities discussed herein with respect to functional testing. Master log database 804 may be configured to receive master log data (e.g., from functional test module 802 and/or master module 102) that indicates whether work chunks (e.g., as specified by data paths in generic configuration data) were successfully placed in message queue 116. Worker log database 806 may be configured to receive work chunk log data (e.g., from worker modules 106 and/or functional test module 802) that indicates whether the work chunks were successfully generated and/or sent (e.g., to the appropriate channel processor 114).

FIG. 9 shows an example of a method 900 for performing a functional test, performed in accordance with some embodiments. Method 900 is described as being performed by test module (e.g., functional test module 802), although other computing devices and/or modules could be configured to perform some or all of the steps described herein. Method 900 may start at 902 and proceed to 904, where the test module may be configured to (e.g., on its own or via control of the master module) schedule message generation, such as described above with respect to method 400.

At 906, after one or more work chunks have been placed in the message queue based on generic configuration data (e.g., at 412 of method 400), the test module may be configured to generate master log data. The master log data may include, for example, meta data regarding the one or more work chunks such as the number of work chunks placed in the message queue, the time when the work chunks were placed in the message queue, work chunk identifying data, or the like.

At 908, the test module may be configured to determine expected master log data. For example, the expected master log data may include data that corresponds with the master log data generated at 906. The expected master log data may be user input to the test module, such as via a user input device, and/or may be programmatically generated, such as with a different (e.g. known working) version of the messaging system.

At 910, the test module may be configured to compare the master log data with the expected master log data to determine whether one or more work chunks (e.g., as specified by the generic configuration data) was successfully placed in the message queue. For example, the comparison may indicate that only a portion of the expected number of work chunks were successfully placed in the message queue, that the work chunks were placed in the message queue at the expected time, etc. Virtually any parameter of message scheduling may be logged and compared. Furthermore, the test module may be configured to report the results of the comparison (e.g., to a graphical user interface).

At 912, the test module (e.g., on its own or via control of worker modules) may be configured to create scheduled messages, such as described above at 504 and 506 of method 500. At 914, after one or more messages have been generated and/or sent based on a work chunk retrieved from the message queue, the test module may be configured to generate worker log data. The worker log data may include, for example, meta data regarding the work chunk, such as the number of messages in the work chunk that was generated and/or sent, the amount of time taken to generate the messages, or the like. In some embodiments, as described above, the test module may be further configured to determine that the channel data is null and to not actually send generated messages (e.g., test messages) to the channel processors and/or to send the messages to the channel processors with any suitable type of do-not-send indications.

At 916, the test module may be configured to determine expected worker log data. The expected worker log data may include data that corresponds with the worker log data. The expected worker log data may be user input to the test module, such as via a user input device, and/or may be programmatically generated, such as with a different (e.g. known working) version of the messaging system.

At 918, the test module may be configured to compare the worker log data with the expected worker log data to determine whether the one or more messages of the work chunk were successfully processed (e.g., generated and/or sent). For example, the comparison may indicate that only a portion of an expected number of messages in the work chunk were successfully processed, that only a portion of an expected number of messages were successfully sent to channel processors, that the messages took an expected amount of time to generate and/or send, etc. Virtually any parameter of message creation may be logged and compared. Furthermore, the test module may be configured to report the results of the comparison (e.g., to a graphical user interface). Method 900 may then end.

Conclusion

Many modifications and other embodiments of the inventions set forth herein will come to mind to one skilled in the art to which these embodiments of the invention pertain having the benefit of the teachings presented in the foregoing descriptions and the associated drawings. For example, while some embodiments discussed herein refer to message generation for promotional deal offers, similar techniques may be applicable to message generation systems that generate messages for any purpose, to any user, and/or via any electronic channel. Furthermore, some embodiments may have particular application in environments that leverage high volume message generation or where the content and/or recipients of the messages are subject to change with little or no prior notice (e.g., emergency warning systems, daily deals, limited time offers, etc.). Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for facilitating transmission of a plurality of electronic messages in a message system, the apparatus comprising at least one processor and at least one non-transitory memory including program code, the at least one non-transitory memory and the program code configured to, with the at least one processor, cause the apparatus to:
    receive generic configuration data, wherein the generic configuration data comprises a plurality of data paths, time data, and channel data associated with the plurality of electronic messages;
    retrieve a first work chunk based at least in part on the plurality of data paths, wherein the first work chunk comprises a first content data path pointing to first message data stored in a message content repository;
    update, based at least in part on the time data, the first content data path to a second content data path pointing to second message data stored in the message content repository;
    generate a first electronic message based at least in part on the second content data path; and
    transmit the first electronic message based on the channel data of the generic configuration data.

2. The apparatus of claim 1, wherein the time data indicates transmission time for each of the plurality of electronic messages.

3. The apparatus of claim 1, wherein each of the plurality of data paths points to one of work chunks associated with the plurality of electronic messages.

4. The apparatus of claim 1, wherein the at least one non-transitory memory and the program code are configured to, with the at least one processor, cause the apparatus to:
    access the second message data from the message content repository, wherein the second message data comprises content data and recipient data; and
    generate the first electronic message based on the second message data.

5. The apparatus of claim 4, wherein the at least one non-transitory memory and the program code are configured to, with the at least one processor, cause the apparatus to:
    customize the first electronic message based on the recipient data, wherein the recipient data comprises consumer identification data.

6. The apparatus of claim 1, wherein the at least one non-transitory memory and the program code are configured to, with the at least one processor, cause the apparatus to:
    subsequent to transmitting the first electronic message, receive a status update indication;
    generate updated data paths based on the status update indication and the time data of the generic configuration data;
    retrieve a second work chunk based on the updated data paths and the time data of the generic configuration data; and
    generate a second electronic message based on the second work chunk.

7. The apparatus of claim 6, wherein the status update indication includes a soft bounce notification associated with the first electronic message.

8. A computer program product for facilitating transmission of a plurality of electronic messages in a message system, the computer program product comprising at least one non-transitory computer-readable storage medium having computer-readable program code portions stored therein, the computer-readable program code portions comprising an executable portion configured to:
receive generic configuration data, wherein the generic configuration data comprises a plurality of data paths, time data, and channel data associated with the plurality of electronic messages;
retrieve a first work chunk based at least in part on the plurality of data paths, wherein the first work chunk comprises a first content data path pointing to first message data stored in a message content repository;
update, based at least in part on the time data, the first content data path to a second content data path pointing to second message data stored in the message content repository;
generate a first electronic message based at least in part on the second content data path; and
transmit the first electronic message based on the channel data of the generic configuration data.

9. The computer program product of claim 8, wherein the time data indicates transmission time for each of the plurality of electronic messages.

10. The computer program product of claim 8, wherein each of the plurality of data paths points to one of work chunks associated with the plurality of electronic messages.

11. The computer program product of claim 8, wherein the computer-readable program code portions comprise the executable portion configured to:
access the second message data from the message content repository, wherein the second message data comprises content data and recipient data; and
generate the first electronic message based on the second message data.

12. The computer program product of claim 11, wherein the computer-readable program code portions comprise the executable portion configured to:
customize the first electronic message based on the recipient data, wherein the recipient data comprises consumer identification data.

13. The computer program product of claim 8, wherein the computer-readable program code portions comprise the executable portion configured to:
subsequent to transmitting the first electronic message, receive a status update indication;
generate updated data paths based on the status update indication and the time data of the generic configuration data;
retrieve a second work chunk based on the updated data paths and the time data of the generic configuration data; and
generate a second electronic message based on the second work chunk.

14. The computer program product of claim 13, wherein the status update indication includes a soft bounce notification associated with the first electronic message.

15. A computer-implemented method for facilitating transmission of a plurality of electronic messages in a message system, the computer-implemented method comprising:
receiving, by a processor, generic configuration data, wherein the generic configuration data comprises a plurality of data paths, time data, and channel data associated with the plurality of electronic messages;
retrieving, by the processor, a first work chunk based at least in part on the plurality of data paths, wherein the first work chunk comprises a first content data path pointing to first message data stored in a message content repository;
updating, by the processor and based at least in part on the time data, the first content data path to a second content data path pointing to second message data stored in the message content repository;
generating, by the processor, a first electronic message based at least in part on the second content data path; and
transmitting, by the processor, the first electronic message based on the channel data of the generic configuration data.

16. The computer-implemented method of claim 15, wherein the time data indicates transmission time for each of the plurality of electronic messages.

17. The computer-implemented method of claim 15, wherein each of the plurality of data paths points to one of work chunks associated with the plurality of electronic messages.

18. The computer-implemented method of claim 15, further comprising:
accessing, by the processor, the second message data from the message content repository, wherein the second message data comprises content data and recipient data; and
generating, by the processor, the first electronic message based on the second message data.

19. The computer-implemented method of claim 18, further comprising:
customizing, by the processor, the first electronic message based on the recipient data, wherein the recipient data comprises consumer identification data.

20. The computer-implemented method of claim 15, further comprising:
subsequent to transmitting the first electronic message, receiving, by the processor, a status update indication;
generating, by the processor, updated data paths based on the status update indication and the time data of the generic configuration data;
retrieving, by the processor, a second work chunk based on the updated data paths and the time data of the generic configuration data; and
generating, by the processor, a second electronic message based on the second work chunk.

* * * * *